Sept. 1, 1959          W. A. HALL          2,901,852
ARTIFICIAL FOLIAGE AND METHOD OF MANUFACTURE
Original Filed Oct. 14, 1952
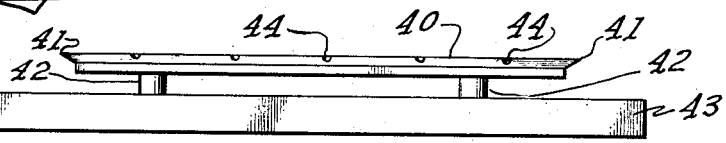
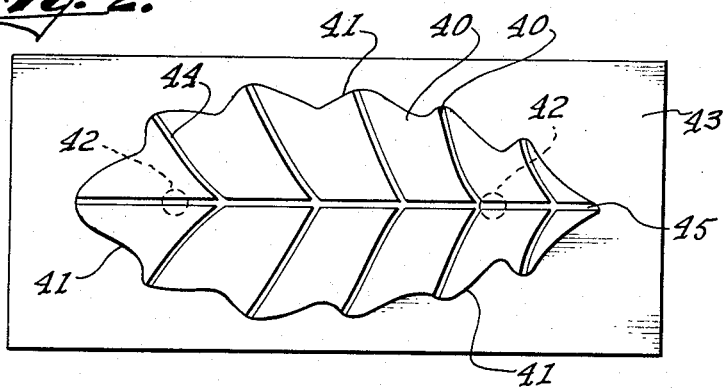
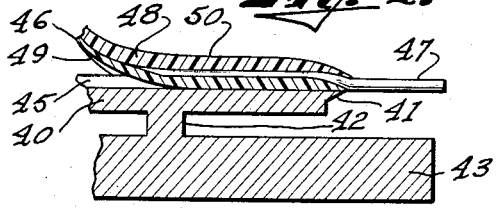
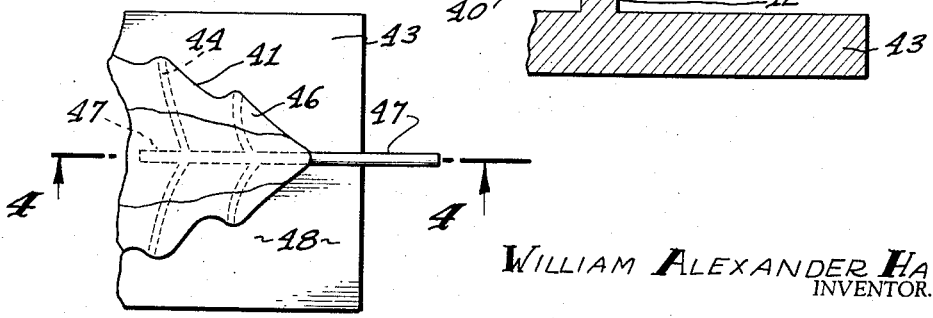
WILLIAM ALEXANDER HALL
INVENTOR.
BY
AGENT 12,901,852
Patented Sept. 1, 1959

2,901,852

ARTIFICIAL FOLIAGE AND METHOD OF MANUFACTURE

William Alexander Hall, Santa Ana, Calif.

Original application October 14, 1952, Serial No. 314,602, now Patent No. 2,791,854, dated May 14, 1957. Divided and this application May 6, 1957, Serial No. 657,416

1 Claim. (Cl. 41—13)

This invention relates to the manufacture of artificial leaves, this application being a divisional application of my copending application Serial No. 314,602, filed October 14, 1952, now U.S. Patent No. 2,791,854.

It has long been the practice in making artificial flowers and foliage to cut the individual parts, such as petals, stamens, leaf forms, and others, and to assemble these parts by hand upon stems of wire or other suitable material. The parts to be assembled are often complex in design and so small as to be difficult to handle; when made of paper they are easily torn and crumpled. The extent of manual work results in many specimens of wilted appearance which must be commercially rejected. It is particularly difficult to hand-cut, stamp, or press any material, be it paper, cloth, or plastic sheeting, so as to produce the thin petal and leaf edges and thicker stem or central parts characteristic of many plants, or the curves and convolutions of, say, an orchid.

It is an object of this invention to provide a method for manufacturing artificial leaves which eliminates much of the manual labor hitherto deemed necessary in such manufacture and which thereby greatly reduces the cost.

Still another object of the invention is to provide a method of manufacture which eliminates die-stamping of leaves, saving not only the cost of dies but the large waste of material from which stampings are cut.

A more direct and specific object of my invention is to provide artificial leaves, of design and construction which permit the mass manufacture of leaves of superior realism by novel and economical methods.

A further precise object of my invention is to provide a method of artificial leaf manufacture by which such features of natural flora as variations of color on a leaf, or the curvature, fringe attenuation, fringe dentation or lobation, and venation of a leaf, or the petiolation of a leaf may be economically and realistically recreated in the product.

In carrying out my invention, I prepare a pattern plate of the leaf to be reproduced, and upon one side of this pattern plate I form the leaf by spraying or painting with suitable plastic material or by dipping in such material or by pressing on thin sheets or patches of such material. It will be noted that my process is not a molding process in the sense of an enclosed or injection mold wherein both sides of a foliage element would be pressed or cast, but rather consists in building up a thin and realistic model of the desired flora element upon one side of a pattern plate. As material for the flora element I may use an artificial rubber but other materials of the general plastic class of natural or synthetic gums and resins which dry to a flexible, non-tacky consistency and which then readily peel and separate from the pattern and which hold their shape flexibly are also available and suitable.

The pattern plate for a single leaf may be a thin metal sheet on a suitable support or for a cluster of leaves, the plate may be an exact representation of the cluster, raised from a supporting block. In either case, the margins of the pattern plate are very thin, and are both raised and spaced laterally from the supporting structure so that material applied to the plate receives a sharp peripheral delineation, finding no surfaces contiguous to the edge of the pattern upon which it may drip, run, or spread. The pattern plate has whatever grooves and ridges are required to form the veins of leaves and may have sprue-like openings or tubes for the placement of stems. Such elements are preformed and are appropriately placed in or upon the pattern plate, where they receive a partial coating of the artificial rubber or similar material to bond them to the leaf.

The plastic material used to form the artificial leaf may be dyed or otherwise colored prior to its application to the pattern and may be applied in several layers. Yellow spots on green leaves may be formed by flicking on spots of yellow material, either directly on the pattern before the green material or after the application of the latter. Leaf stems may be applied to leaves already formed of one layer of plastic material, and a second layer may be applied as a lamination upon and close to the stem. This will bond the stem to the leaf and also give that added thickness close to the stem which is natural to a leaf.

In the drawing,

Fig. 1, is a side elevational view of a pattern for a leaf.

Fig. 2, is a plan view of the pattern of Fig. 10;

Fig. 3, is a fragmentary plan view showing a leaf molded on the pattern; and

Fig. 4, is a sectional view on the line 13—13 of Fig. 3, the leaf being shown in part stripped from the pattern.

Having reference to the details of the drawing,

In Figs. 1 to 4 I have illustrated the formation of a leaf. A pattern plate 40, representative in area and in venation of the desired artificial leaf, has thin sharp margins 41 spaced from all supporting structure, for which purpose the plate 40 may be supported on columns 42 on a base 43. Suitable simulation of the venation and petiolation of the leaf blade may be attained by shallow grooves 44 and 45. To form a leaf, a lamination 46 of driable liquid gummy material is spread upon the pattern plate 40 and a stem 47 is pressed upon the lamination 46 while the latter is still tacky. A second lamination 48 of material similar to the lamination 46 is then applied to bond the stem 47 between the two laminations, the laminations being bonded to each other. For small leaves which may be quickly spread or for thick leaves which do not dry quickly, the lamination 46 may be extended to the margins 41 and the lamination 48 may be placed only along the center part of the leaf, to conceal and to reenforce the junction of the leaf stem 47 with the blade of the leaf, as shown in Figs. 3 and 4. It will be apparent, however, that liquid gummy material may be sprayed in such a manner as to leave no visible dividing line at the edge of the narrower lamination, and it is then immaterial with respect to appearance which of the laminations 46 and 48 is applied first. If the leaf is large and thin, it may be advantageous to apply the under lamination 46 only along the center of the leaf and to extend the upper lamination 48 to the margins 41. In either arrangement, the so formed leaf has thin edges which may taper and which terminate abruptly at the margins 41, with no necessity for subsequent trimming. Spots, stripes, and indications of natural blemishes may be simulated by inlays, spattered, painted or pressed upon the pattern 40 as in the case of the inlay 49 or spattered, painted or pressed upon the upper surface of the leaf as in the case of the inlay 50. The inlays are preferably of the same material as the leaf, differently colored, and if representative of blisters or nodules they may be formed and partly dried to hold their shape before being pressed into place.

When the driable liquid gummy material is spread upon the pattern plate 40 and is extended to the sharp margins 41, it will naturally terminate there. Any overflow is cut by the margins 41, and it will be found that even very gummy material will be so cut and will not hang in drippings from the sharp margins. Consequently, there is no need for trimming. Instead of having to cut the edges of a leaf, the edges are cut by the pattern plate itself.

Because of the many possible variations, I do not desire the scope of my invention to be limited to the particular forms illustrated or to the use of any particular material except as such limitations of form and material are expressed in the appended claim.

I claim:

The process of making artificial leaf-like representations which comprises the steps of providing a pattern plate in the form of a leaf-like article having a sharp-edged margin free of any externally contiguous support and over which any excess of material applied to said pattern plate is free to flow, applying plastic material in fluid form to said plate in excess amount whereby the excess overflows the sharp-edged margin thereby to form a smooth edge on said plastic material retained on the plate, embedding a representation of a stem in said retained plastic material while said material is still tacky, allowing said retained plastic material to set, and removing the so-formed article from said plate.

References Cited in the file of this patent

UNITED STATES PATENTS

| | | |
|---|---|---|
| 719,632 | Akeley | Feb. 3, 1903 |
| 1,475,579 | Harlan | Nov. 27, 1923 |
| 2,046,954 | La Verne et al. | July 7, 1936 |
| 2,054,605 | Rogers | Sept. 15, 1936 |
| 2,095,195 | Macdonald | Oct. 5, 1937 |
| 2,718,033 | Burke | Sept. 20, 1955 |
| 2,718,668 | Burke | Sept. 27, 1955 |